(No Model.)
W. P. BRETT.
FRICTION CLUTCH.
No. 335,106. Patented Feb. 2, 1886.
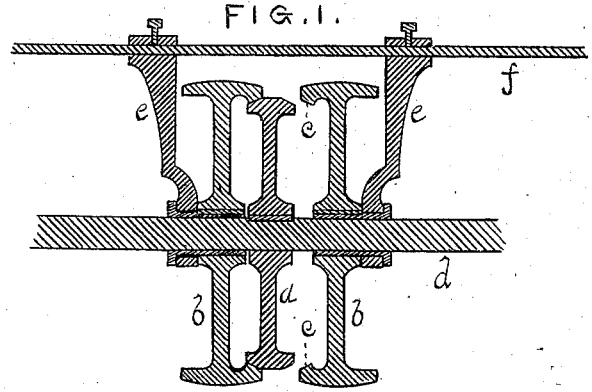
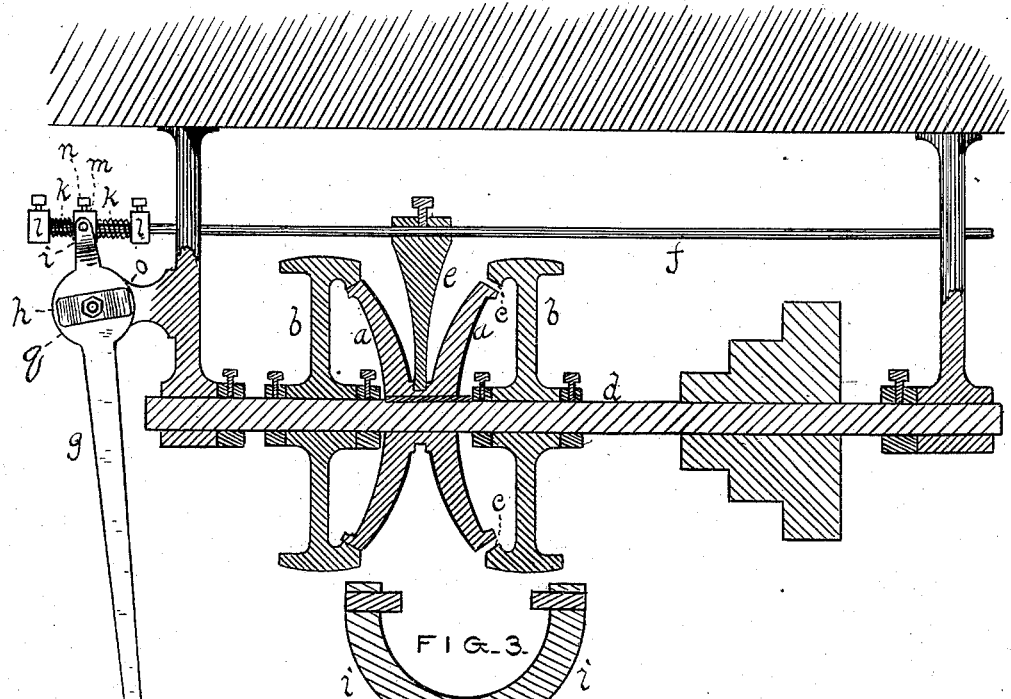
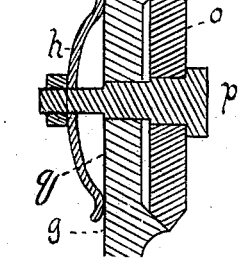
WITNESSES.
J. O. Eyman
J. D. Walker
INVENTOR
W. P. BRETT.
By L. P. Graham
atty.

UNITED STATES PATENT OFFICE.

WILLIAM P. BRETT, OF DECATUR, ILLINOIS.

FRICTION-CLUTCH.

SPECIFICATION forming part of Letters Patent No. 335,106, dated February 2, 1886.

Application filed June 18, 1885. Serial No. 169,054. (No model.)

*To all whom it may concern:*

Be it known that I, WILLIAM P. BRETT, a resident of the city of Decatur, county of Macon, and State of Illinois, have invented certain new and useful Improvements in Friction-Clutches, of which the following is a specification.

The object of my invention is to produce a simple and effective friction-clutch that will be capable of universal application.

My invention relates to the construction and arrangement of the driving and driven wheels, whereby direct frictional contact is had, and to the construction and arrangement of suitable mechanism for throwing and holding them in or out of contact under a variety of circumstances.

In the drawings accompanying and forming a part of this specification, Figure 2 is a side elevation of my device, showing my wheels and accessories in central vertical section. Fig. 1 shows a modification of the wheels, shaft, and shifting device in central vertical section. Fig. 3 shows a central longitudinal section of a friction-clamp which constitutes a part of the shifting mechanism.

$a$ is a wheel provided with an annular friction-surface, and adjusted to rotate continuously with its shaft.

$b$ is a belt-pulley adjusted to rotate independently on the shaft, and provided with a suitable friction-surface to coact with the friction-surface of $a$.

$d$ is the shaft on which the pulleys are mounted.

$e$ is a device on rod $f$, whereby the motion of shifting-lever $g$ is utilized to throw the wheels in or out of contact.

$h$ is a spring on the friction-clamp, that regulates and equalizes the friction thereof.

$p$ is a bolt that holds the opposing disks of the clamp in close contact and regulates the tension of spring $h$.

$o$ is a permanent friction-disk of the clamp, while disk $q$ is free to rotate with bolt $h$ as its axis, the friction-surfaces of disks $o$ and $q$ being concentric with bolt $p$.

$i$ represents a bifurcated termination of lever $g$.

$k\ k$ are tension-springs on rod $f$. $l\ l$ are adjustable collars on said rod, that are used to regulate the tension of said springs.

$m$ is a collar on rod $f$, with which the shifting-lever is connected.

$n$ is a set-screw for making the collar $m$ rigid on rod $f$.

The annular portion $c$ on the pulley-rim (or other parts of the pulley, if circumstances require) furnishes a means whereby friction may be obtained by direct contact with the pulley.

The duty of friction-clamp, Fig. 3, is to hold the pulleys firmly in or out of contact.

The function of the springs $k\ k$ is to provide an elastic resistance to the action of the lever when it is required to start the machinery with which the clutch is connected slowly, and their tension should be sufficiently strong to produce the required friction in the wheels. When the springs $k\ k$ are in operation, the collar $m$ must move freely on the rod; but when a quick response to the action of the lever is required, then collar $m$ is made rigid on the rod by tightening set-screw $n$, and thereby rendering the springs inoperative. The collar $m$ is slotted to permit the free action of the lever therein. That portion of bolt $h$ that passes through the lever-disk of the clamp is square in cross-section, in order that there may be no maladjustment in spring $h$.

In Fig. 1 wheel $a$ is rigidly attached to the shaft, while wheels $b$ are adjusted to move laterally on the shaft and revolve loosely and independently thereon.

In Fig. 2 wheels $b$ are held laterally on the shaft, while free to rotate independently thereon, and $a$ is constructed so as to move laterally on the shaft and impart its rotary motion thereto.

The pulleys may be used as shown. Gear-wheels may be substituted therefor. One belt-pulley may be used, or the friction-pulley may be also used as a belt-pulley.

In operation the lever is used to throw the wheels in or out of contact, and the friction-clamp retains them in their adjusted positions. Springs $k\ k$ afford sufficient elasticity to the action of the lever to enable the clutch to safely and readily start a heavy load.

Figs. 1 and 2 represent different arrangements of the wheels on reverse counter-shafts.

By the use of three pulleys, as shown, the motion may be imparted in opposite directions alternately or withheld, and by the use of two wheels it may be imparted in one direction or withheld at pleasure.

It will be readily seen that a V or other compound form of friction-surface may be substituted for the common bevel shown, the result being to increase the power of the device without in any manner affecting the principle of its operation. The elastic adjusting device, in addition to the function previously accorded to it, also compensates for irregularities in the construction of the clutch, as if one portion of the clutch should not operate with absolute precision the other portion, through its elastic adjustment, would conform to the irregularities, and so effect a perfect operation.

I claim as new and desire to secure by Letters Patent—

1. In friction-clutches, the combination, on one shaft, of a friction driving-wheel, an adjacent driven wheel, and suitable means of throwing and holding the wheels in or out of contact, whereby the opposing surfaces of the driving and driven wheels are directly utilized, as and for the purpose set forth.

2. The friction-clamp, Fig. 3, consisting of a movable disk, $q$, having a suitable friction-surface, a permanent opposing disk, $o$, with a friction-surface suitable to coact with the friction-surface of disk $q$, and bolt $p$ and spring $h$, whereby the disks are held in close contact and the necessary amount of friction is acquired and retained.

3. A device for adjusting and holding the co-operative parts of a friction-clutch in or out of contact, consisting in a lever, suitable means of connecting the lever with the sliding portion of the clutch, and a frictional adjusting mechanism, whereby the lever and clutch are retained as adjusted.

4. The combination of pulleys $a$ and $b$, controlling device $e$ on rod $f$, friction-clamp, Fig. 3, shifting-lever $g$, springs $k\ k$, collars $l\ l$, and collar $m$, constructed and arranged to operate as set forth, whereby the motion of the shifting-lever is elastically or rigidly imparted to the pulleys, as and for the purpose set forth.

5. A device for adjusting and holding the co-operative parts of a friction-clutch in or out of contact, consisting in a lever, suitable means of elastically connecting the lever with the sliding portion of the clutch, and a frictional adjusting mechanism, whereby the lever and clutch are retained as adjusted.

In testimony whereof I sign my name in the presence of two subscribing witnesses.

WM. P. BRETT.

Attest:
C. C. CLARK,
L. P. GRAHAM.